United States Patent [19]

Wolf et al.

[11] Patent Number: 4,883,282

[45] Date of Patent: Nov. 28, 1989

[54] APPARATUS FOR SUPPORTING THE HANDICAPPED OR ELDERLY

[76] Inventors: Isobel T. Wolf, Rte. 3, Box 540, Dunn, N.C. 28334; Clifton Baldwin, 4493 Chisolm Rd., John's Island, S.C. 29455

[21] Appl. No.: 165,178

[22] Filed: Mar. 7, 1988

[51] Int. Cl.[4] .................................................. B62B 7/08

[52] U.S. Cl. .................................... 280/43.24; 135/67; 182/15; 248/205.8; 272/70.3

[58] Field of Search ............................ 135/67; 269/21; 248/205.8, 205.9, 362, 363; 182/15, 17; 280/43.24, 87.03; 272/70.3

[56] References Cited

U.S. PATENT DOCUMENTS

| | | | |
|---|---|---|---|
| 577,436 | 2/1897 | Lenz | 248/363 |
| 961,093 | 6/1910 | Astor | 248/362 |
| 2,812,614 | 11/1957 | Ladyman | 248/362 X |
| 3,878,573 | 4/1975 | Boudewyn | 248/362 X |
| 4,009,904 | 3/1977 | Sheldon | 248/362 X |
| 4,236,693 | 12/1980 | McCrea | 269/21 X |
| 4,332,378 | 6/1982 | Pryor | 135/67 |

FOREIGN PATENT DOCUMENTS

| | | | |
|---|---|---|---|
| 1313570 | 4/1973 | United Kingdom | 272/70.3 |
| 1342397 | 1/1974 | United Kingdom | 135/67 |

*Primary Examiner*—Charles A. Marmor
*Assistant Examiner*—Michael Mar
*Attorney, Agent, or Firm*—Rhodes, Coats & Bennett

[57] ABSTRACT

The present invention relates to an apparatus used by the handicapped, feeble or elderly sepecially in the process of dressing. An upright wheel support structure is provided and includes a handle about an upper portion thereof. A suction device is disposed about the lower part of the structure and acts to grip the floor so as to anchor the entire apparatus. While anchored an individual can grasp the handle and support him or herself while being dressed.

14 Claims, 2 Drawing Sheets

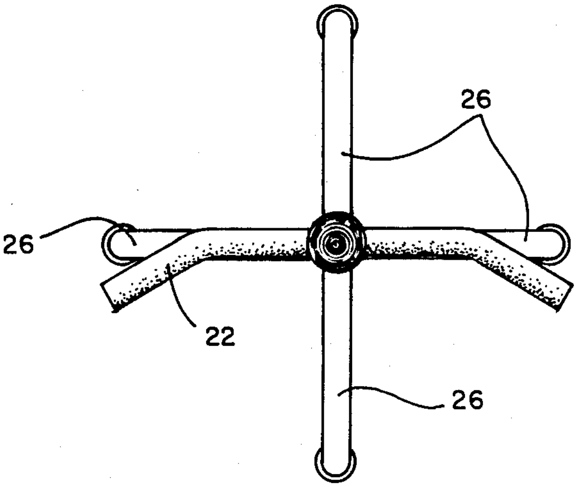
FIG. 2
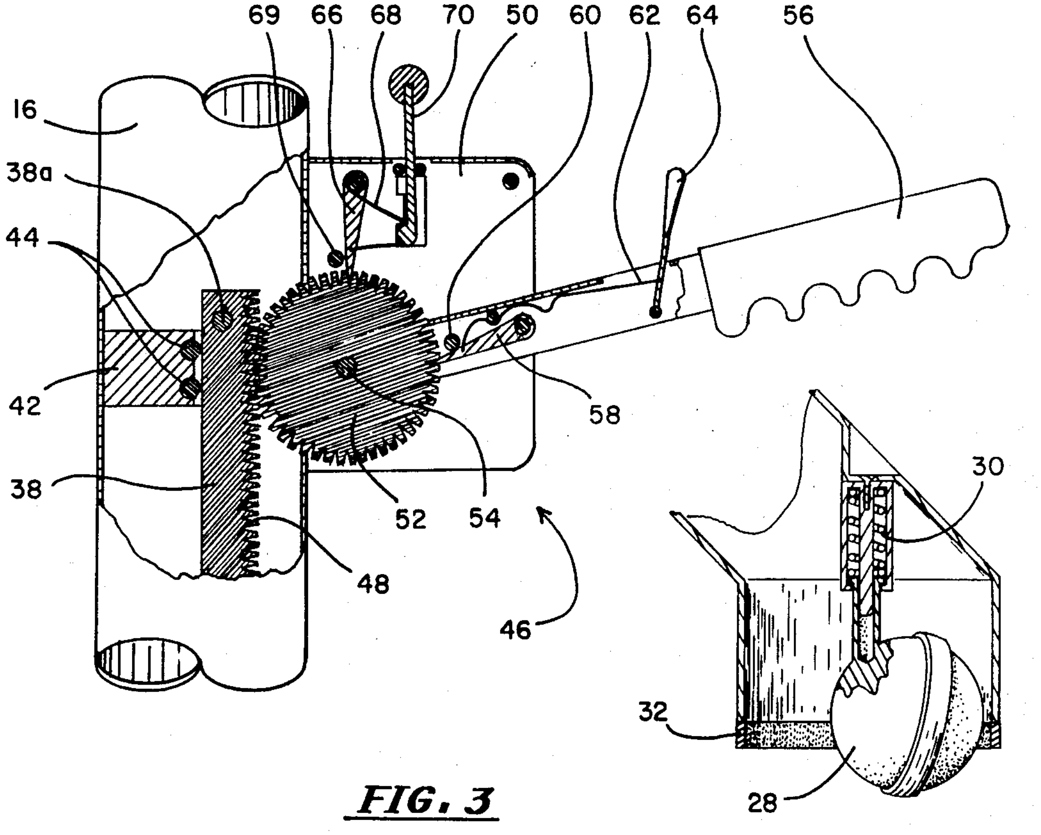
FIG. 3
FIG. 4

APPARATUS FOR SUPPORTING THE HANDICAPPED OR ELDERLY

FIELD OF THE INVENTION invention relates to devices used for supporting the handicapped or the elderly, and more particularly relates to a stand-up support structure that can be selectively anchored to the floor and which is designed to support an individual in a standing position while that individual is being dressed.

BACKGROUND OF THE INVENTION

There are literally thousands of people throughout the United States and World that cannot dress themself. This obviously includes the handicapped, feeble and elderly. In rest homes and in other caring facilities, the dressing of handicapped and elderly people is both a problem and a task. Often these individuals are dressed while laying in a bed or sitting in a chair. Clearly when the patient or individual being dressed is so postured, it is quite difficult to place various articles of clothing around his or her body. The net result is often a time consuming and very frustrating exercise.

Therefore, there has been and continues to be a need for an aid to assist in supporting an elderly or handicapped individual in a standing upright posture in order that that individual can be more easily dressed and cared for.

SUMMARY AND OBJECTS OF THE INVENTION

The present invention entails an apparatus specifically designed to support an individual while he or she is being dressed. In particular, the apparatus of the present invention includes a wheel supported upright structure that includes a handle formed on the upper portion thereof. The presence of the handle enables an individual to hold and at least partially support himself or herself while being dressed. In order to selectively station or anchor the dressing aid of the present invention there is provided about the lower portion thereof a suction head. The apparatus is designed such that the suction head can be brought into engagement with the underlying floor and thereafter a vacuum can be induced within the suction head which effectively anchors the entire apparatus to the floor.

It is therefore an object of the present invention to provide an apparatus for supporting a handicapped or elderly individual in order that that individual can be more easily dressed.

Still a further object of the invention resides in the provision of a dressing aid that is in the form of an upright structure that includes a handle for grasping and which further includes means for positively anchoring the apparatus to the floor.

Still a further object of the present invention resides in the provision of an apparatus designed for assisting in multiple ways in the support of the handicapped or elderly.

Still a further object of the present invention resides in the provision of a support structure of the character referred to above which is specifically designed to assist in the support of an individual when that individual is standing.

Another object of the present invention resides in the provision of a multi-purpose aid that can be used as a stationary support.

Another object of the present invention is to provide a support structure of the character referred to above that is relatively simple, easy to manufacture, but which is sturdy and durable.

Another object of the present invention resides in the provision of a support apparatus of the character referred to above that is sufficiently portable to allow the same to be easily moved and transported between locations and which also allows the same to be easily stored.

Another object of the present invention is to provide a positive anchoring system for the support apparatus which can be actuated relatively easy.

It is also an object of the present invention to provide a support apparatus of the character referred to above which can be vertically adjusted for various heights.

Other objects and advantages of the present invention will become apparent and obvious from a study of the following description and the accompanying drawings which are merely illustrative of such invention.

BRIEF DESCRIPTION OF THE DRAWINGS

FIG. 2 is a top plan view of the support apparatus.

FIG. 3 is a fragmentary side view of the ratchet drive mechanism for the suction head and wherein portions are broken away to better illustrate the structure thereof.

FIG. 4 is a fragmentary view illustrating the spring loaded wheels of the support apparatus.

DETAILED DESCRIPTION OF THE INVENTION

Figure 1:
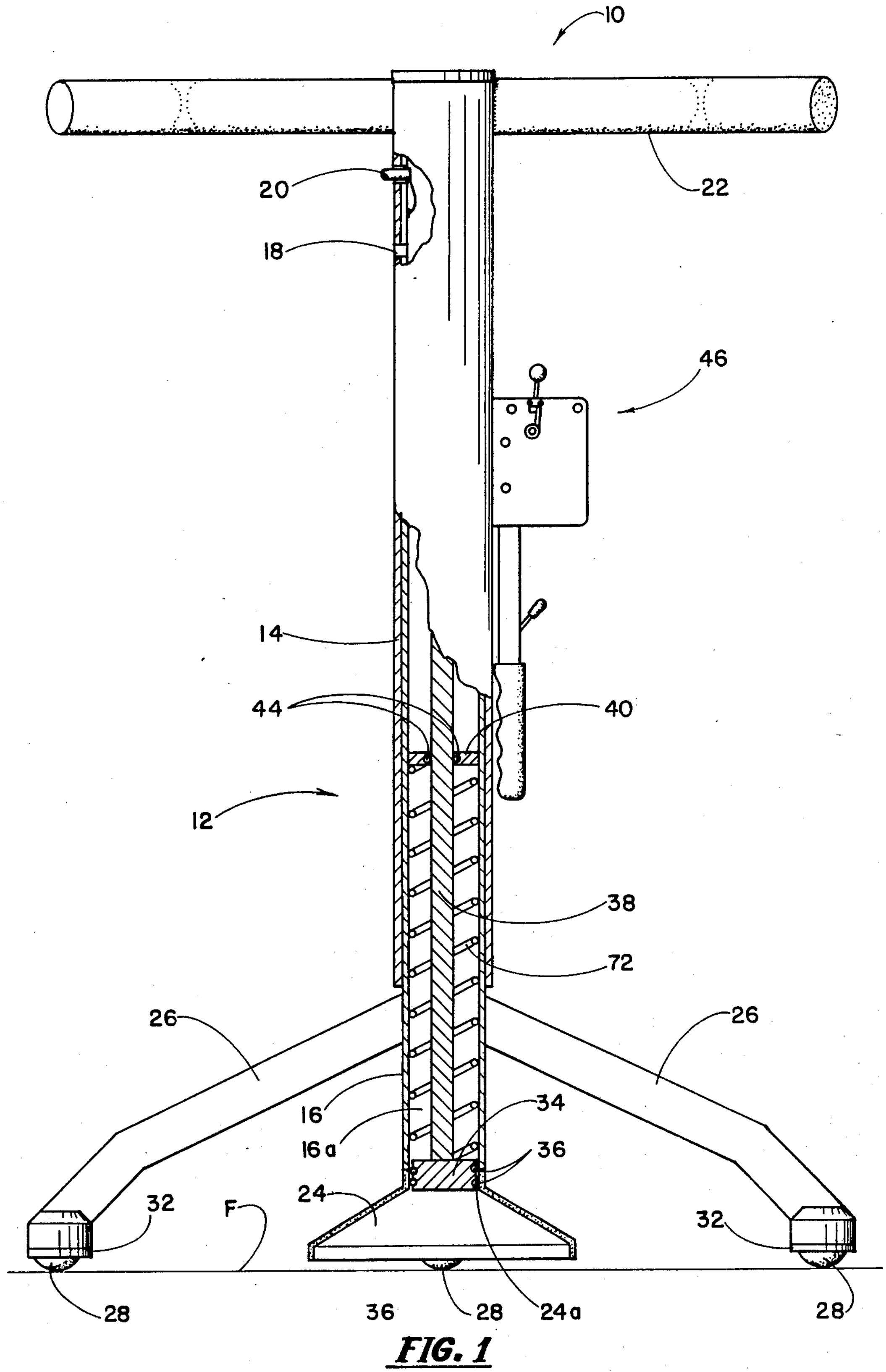
FIG. 1 is a side elevational view of the support apparatus of the present invention with portions broken away to better illustrate the internal structure of the apparatus.

With further reference to the drawings, the support apparatus of the present invention is shown therein and indicated generally by the numeral 10.

Viewing support apparatus 10 in more detail, it is seen that the same comprises an elongated, upright frame structure indicated generally by the numeral 12. Upright frame structure 12 includes an outer tubing 14 and an inner tubing 16. The tubing 14 and 16 are telescopically connected together inasmuch as each can move with respect to the other.

To adjust the height of the support apparatus 10 about the upper portion of the tubing 14 and 16, there is provided a series of vertically spaced openings 18. There is provided a stationary spring loaded pin 20 that can be depressed through openings 18 to adjust the height and released to lock and retain the altered position of the upright frame structure 12.

Secured to the top portion of the upright frame structure 12 is a handle 22 that is preferably constructed such that it includes an outer at least slightly resilient or soft surface for purposes of safety and comfort.

Inner tubing 16 includes an open inner chamber **16*a*. Secured to the lower end of inner tubing 16 is a suction head 24 having an upper opening 24*a* formed therein that makes chamber 16*a* open to the internal area within the suction head 24**.

Secured to the lower portion of inner tubing 16 is a plurality of wheel arms 26 that project radially from the inner tubing 16. Secured to the lower remote ends of wheel arms 26 are a series of spring loaded wheels 28.

Note in FIG. 4, the provision of a spring 30 interconnected between each wheel 28 and the respective wheel arm 26. Also, formed about the lower, outer end of each wheel arm is a rubber cushion collar 32.

As illustrated in FIG. 4, in a normal, nonanchored position, the lower portion or end of suction head 24 is spaced upwardly from the floor F. This is achieved by the spring loaded wheels 28. It is appreciated that by applying a downward force to the handle 22 or the suction head 24 that the spring force of spring 30 associated with each wheel can be overcome and the lower end of the suction head 24 can be made to engage the floor F. The significance of this will be more fully understood from subsequent portions of this disclosure.

The support device 10 of the present invention is provided with means for generating a vacuum within the suction head 24. Thus, when the suction head 24 engages the floor F and a vacuum is created within the suction head 24, it is appreciated that this action will effectively anchor the entire support apparatus 10 to the floor F and will provide ample, stable support for an individual to grasp and be supported thereby.

In order to generate this vacuum, the present invention provides a piston assembly movably mounted within chamber **16*a*. The piston assembly comprises a piston 34 that includes a pair of O-ring seals 36 secured therearound. Piston 34 is movable up and down within inner chamber 16*a*. Because of O-rings 36, there will exist an air sealed relationship between the inner area of suction head 24 and chamber 16*a***.

A rack 38 is secured to the top of piston 34 and extends upwardly therefrom. Rack 38 is confined within inner tubing 16 by two vertically spaced rack guides 40 and 42 which can be viewed in FIGS. 1 and 3. Each rack guide 40 and 42 includes an opening therein for receiving the rack 38 and includes one or more roller pins 44 that facilitate the vertical up and down movement of the rack 38. Note that the downward movement of rack 38 is limited by a transverse stop **38*a* that extends across the top portion of the rack 38 and engages the upper guide rack 42** when the rack is in its lowermost position.

As seen in FIG. 3, the ratchet drive, indicated generally by the numeral 46, is operatively connected to the piston assembly for raising the same. Viewing ratchet drive 46, it is seen that the same includes a series of teeth 48 formed on one side of the rack 38. Secured to the elongated, upright frame structure 12 in the vicinity of the teeth 48 on the rack 38 is a ratchet housing 50. Rotatively mounted to the ratchet housing 50 is a ratchet gear 52 that is rotatively mounted on an axle or pin 54. A handle 56 is also rotatively mounted about axle 54 and extends readily therefrom. Handle 56 is designed to rotate ratchet gear 52 clockwise as viewed in FIG. 3. To achieve this, the handle 56 is provided with a handle pawl 58 pivotally mounted thereto. A pawl locking pin 60 is secured to the handle and in the position shown in FIG. 3 engages handle pawl 58 and holds the same in place such that the ratchet gear 52 can be turned clockwise. To disengage handle pawl 58, there is provided a two position spring 62 that is engaged with the handle pawl 58 and which is actuated through spring handle 64. It is appreciated that in the position shown in FIG. 3, that the handle pawl 58 will drive the ratchet gear 52 clockwise as the handle 56 is turned in a clockwise fashion. When handle 56 is rotated counterclockwise, the pawl 58 will ratchet over the teeth of ratchet gear 52. To disengage pawl 58 from the ratchet gear 52, handle 56 is turned counterclockwise and at the same time spring handle 64 is pushed to the left as viewed in FIG. 3. This action results in the two positions spring 62 moving to the second position which results in the handle pawl being moved to an inoperative position.

The ratchet drive 46 further includes means to lock the ratchet gear 52 in a certain position. To achieve this, there is provided a pivotally mounted locking pawl 66 that is held in a locked position by locking pin 69. There is also provided a wire spring 68 that is engaged with locking pawl 66 and extends therefrom for connection with a pawl actuator 70. Pawl actuator 70 in FIG. 3 is shown in a locked position. In this locked position the ratchet gear 52 can rotate clockwise as viewed in FIG. 3, but because of the presence of locking pin 69 the ratchet gear 52 cannot rotate counterclockwise. As the ratchet gear 52 is being turned clockwise, the locking pawl 66 can be disengaged from ratchet gear 52 by lifting pawl actuator 70 and moving the same upwardly to an unlocked position. This action disengages pawl 66 from the ratchet gear 52.

The piston assembly is spring biased to its lowermost or release position shown in FIG. 1 by a compression spring 72 positioned between the piston 34 and the lower guide rack 44 which is fixed to the inner tubing 16. Consequently, with the ratchet drive 46 unlocked and disengaged from the ratchet gear 52, spring 72 biases the piston 34 to its lower most position shown in FIG. 1. Note the presence of rack stop **38*a* which limits the downward movement of the piston 34**.

To utilize support structure 10 of the present invention, handle 22 is pushed downwardly toward the floor F to such a degree that springs 30 associated with spring loaded wheels 28 are overcome to such a degree that the lower end or bottom of suction head 24 engages the floor F. At this time, the pawl actuator 70 is pushed downwardly to where pawl 66 locks the ratchet gear 52 from rotating counterclockwise and the ratchet drive 46 is utilized to create a vacuum within the suction head 24. This is accomplished by adjusting spring handle 64 such that pawl 58 engages ratchet gear 52. As seen in FIG. 3, the handle 56 is turned clockwise which results in the rack 38 being moved upwardly. The piston 34 is, consequently, moved from its first lowermost position (FIG. 1) upwardly through chamber **16*a*. This tends to evacuate the suction head 24 creating a vacuum. At this point, the support apparatus is firmly anchored to the floor F and will support an individual. Consequently, an elderly, feeble, or handicapped individual can grasp handle 22 while standing beside the support device 10** and he or she can be dressed.

To release the vacuum, the pawl actuator 70 is pulled upwardly to an unlocked position resulting in the pawl 66 becoming disengaged with the ratchet gear 52. Then the action of spring 72 will enable the piston 34 to be returned to its first, lowermost released position. In this first lowermost position, the vacuum is effectively released from the suction head and at that time the spring loaded wheels 28 will support the support structure 10 in a mode such as shown in FIG. 1. In this position the support device can be rolled from one location to another.

From the foregoing specification and discussion, it is appreciated that the present invention presents a very practical and reliable support structure for the feeble, handicapped, and elderly. It is especially beneficial in supporting an individual while he or she is being dressed by another.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A dressing aid for assisting in the support of an elderly or handicapped individual while that individual is being dressed, comprising:
(a) an elongated upright frame structure having upper and lower portions;
(b) grasping means mounted about the upper end portion of the upright frame structure for supporting an individual, such as an elderly or handicapped person, while the individual grasps and holds on to the same, the grasping means including a handle secured to the upper end portion;
(c) stabilizing means formed about the lower portion of the frame structure for stabilizing the same;
(d) a suction cup mounted to the lower portion of the frame structure and being movable between a position engaged with the underlying floor and a position spaced above the underlying floor;
(e) means for selectively creating a vacuum within the suction cup when the same is engaged with the floor such that the suction cup anchors the entire dressing aid to the floor in order that the individual may rest and support themself thereon while being dressed;
(f) the means for creating the vacuum further including means for automatically releasing the vacuum within the suction cup in order that the dressing aid can be moved from one location to another and
(g) retractable wheel means associated with the stabilizing means for moving between extended and retracted positions such that when a vacuum is created in the suction cup and the suction cup is engaged with the floor, the retractable wheel means may assume a retracted position while the stabilizing means engages the floor and stabilizes the upright frame structure.

2. The dressing aid of claim 1 wherein the means for generating the vacuum in the suction head includes a piston movably mounted about the top portion of the suction head and exposed to the area underneath the suction head; and means for movably mounting the piston with respect to the suction head such that when selectively moved the piston creates a vacuum within the suction head and wherein when the piston is further selectively moved the generated vacuum is released.

3. The dressing aid of claim 2 wherein there is provided an actuator rack secured to the piston and extending upward therefrom and wherein the dressing aid includes means operatively connected to the actuator rack for moving the same upwardly resulting in the piston being moved upwardly which results in a vacuum being generated within the suction head.

4. The dressing aid of claim 3 further including spring means operatively associated with the piston for biasing the piston towards a downward release position where there is no vacuum existing within the suction head.

5. The dressing aid of claim 4 wherein the elongated frame structure includes a hollow vertical member having the suction head mounted to the lower end thereof, and wherein the piston and actuator rack therefore are movably mounted within the hollow member.

6. The dressing aid of claim 5 including means for adjusting the height of the handle with respect to the suction head.

7. The dressing aid of claim 1 wherein the stabilizing means includes a series of leg arms secured to the frame structure and extending outwardly therefrom with each leg arm including an outer terminal end portion; said wheel means including spring loaded wheels mounted to the outer terminal end of each leg arm and wherein the spring loaded wheels generally support the suction head in a spaced position with respect to the underlying floor but wherein the entire dressing aid can be pushed downwardly due to the spring loaded wheels until the suction head engages the underlying 8. An upright support structure for enabling a handicapped, feeble, or elderly person to grasp the support structure while being dressed, comprising:
(a) an elongated upright member having a hollow internal area, a lower portion and an upper portion;
(b) a handle mounted to the upper portion of the elongated upright member;
(c) a suction head secured to the lower portion of the elongated upright member and having an opening formed therein;
(d) a piston assembly movably mounted with respect to the suction head and including (1) a sealed piston communicatively opened to the space within the suction head through the opening therein and movable between a first lowermost position and a second uppermost position for generating and releasing a vacuum in the internal space defined by the suction head, and (2) an actuating rack secured to the sealed piston and extending upwardly therefrom through the hollow portion of the elongated upright member;
(e) a ratchet assembly operatively connected to the actuating rack for moving the sealed piston from the first lowermost position upwardly therefrom towards the second position such that in the process a vacuum is formed within the suction head when the lower portion thereof is sealed against the floor;
(f) spring biasing means disposed within the elongated upright member for engaging the piston assembly and biasing the piston assembly towards the first lowermost position;
(g) stablizing means secured to the elongated upright member and extending outwardly therefrom for engaging the floor and stabilizing the support structure;
(h) the stablizing means including spring loaded wheels that movably support the support structure such that the lower portion of the suction head is normally supported above the floor; and
(i) the spring loaded wheels including springs that enable the support structure to be pushed downwardly with respect to the wheels such that the lower portion of the suction head can be brought into contact with the floor, after which a vacuum can be drawn on the space within the suction head by moving the sealed piston from its lowermost first position towards the uppermost second position which results in the suction head actually anchoring the entire support structure to the floor.

9. The support structure of claim 8 wherein the ratchet means includes a series of teeth formed on the actuator rack, a ratchet gear having teeth thereon engaged with the teeth of the actuator rack, and a turning handle operatively connected to the ratchet gear for turning the same.

10. The support structure of claim 8 wherein the actuating rack is confined within the hollow portion of the elongated upright member by a pair of vertically spaced rack guides.

11. The support structure of claim 10 wherein the rack guides include an opening extending therethrough for receiving the actuator rack and wherein the rack guides further includes rotating means for engaging the actuator rack such that the actuator rack can be moved easily up and down therein while the rack guides maintain the actuator rack in alignment with the sealed piston.

12. The support structure of claim 8 wherein the elongated upright member includes a hollow tube-like structure that is communicatively connected to the open area within the suction head through the opening formed therein; and wherein the sealed piston is disposed within the hollow tube-like structure adjacent the top portion of the suction head such that as the sealed piston is moved upwardly from its lowermost position a vacuum is generated within the suction head when the same is sealed against the floor.

13. The support structure of claim 12 wherein the stabilizing means comprises a series of generally radially extending wheel support arms that extend outwardly from the elongated upright member.

14. A dressing support structure for the elderly, feeble, or handicapped that enables a subject to grasp the same and be supported thereby while he or she is dressed comprising: an upright, elongated support structure having upper and lower ends; grasping means mounted to the upper portion of the upright support structure for enabling an elderly or handicapped individual to grasp the same to be supported by the upright support structure while he or she is dressed, the grasping means including a handle structure secured to the upper support structure; the lower portion of the support structure including an open pipe structure having a suction cup mounted thereto with the suction cup having a top opening formed therein that communicatively opens the open pipe structure of the internal area of the suction cup; piston means sealed within the open pipe structure and movable up and downwardly therein with respect to the suction cup for generating a vacuum in the suction cup when the lower portion thereof is sealed against the floor area such that the entire support structure may be anchored to the floor through the suction cup; a plurality of legs secured to the upper support structure and extending downwardly therefrom and retractable wheel means associated with the legs for moving between extended and retracted positions such that when a vacuum is created in the suction cup and the suction cup is engaged with the floor, the retractable wheel means may assume a retracted position while the legs engages the floor and stabilizes the upright support structure.

* * * * *